United States Patent [19] [11] Patent Number: 4,926,264
Ohno et al. [45] Date of Patent: May 15, 1990

[54] ADDRESSABLE TERMINAL FOR CATV

[75] Inventors: Tamio Ohno; Kousaku Yoshida, both of Tokyo; Masaki Kitagawa, Osaka, all of Japan

[73] Assignees: NEC Corp.; NEC Home Electronics Ltd., both of Japan

[21] Appl. No.: 112,819

[22] Filed: Oct. 23, 1987

[30] Foreign Application Priority Data

Oct. 27, 1986 [JP] Japan .................................. 61-253722

[51] Int. Cl.⁵ .................................................. H04N 7/167
[52] U.S. Cl. ...................................... 358/349; 380/10; 455/4
[58] Field of Search ............... 380/10; 358/349; 455/4

[56] References Cited

U.S. PATENT DOCUMENTS 4,418,424 11/1983 Kawamoto et al. ................. 455/355
4,510,623 4/1985 Bonneau et al. ..................... 455/181
4,792,972 12/1988 Cook ....................................... 380/10

OTHER PUBLICATIONS

Gen. Instr., Jerrold IR Converter Programmer (Model IR-Prog.), Instruction Manual, 436-330-100.

Primary Examiner—Stephen C. Buczinski
Attorney, Agent, or Firm—Ostrolenk, Faber, Gerb & Soffen

[57] ABSTRACT

An addressable terminal for cable television in which the terminal address can be set and changed from outside of the terminal housing, as needed. The terminal includes an exclusive remote control key pad for setting an address. The terminal address can be changed by transmitting new terminal address data from the address setting key pad to an electrically erasable read only memory which is installed in the terminal housing.

6 Claims, 4 Drawing Sheets

FIG. 3A

| KEYPAD 14 | DATA ON DISPLAY 38 | OPERATION OF CPU 22 |
|---|---|---|
|  | 10 | SELECTING IO CHANNELS |
| WRITE |  |  |
| 1 | 1 |  |
| 2 | 12 |  |
| 3 | 123 |  |
| 4 | 1234 |  |
| SET | 10 | WRITING ADDRESS DATA (1234) IN ROM |

FIG. 3B

| KEYPAD 14 | DATA ON DISPLAY 38 | OPERATION OF CPU 22 |
|---|---|---|
|  | 10 | SELECTING IO CHANNELS |
| READ | 1234 | DISPLAYING DATA (1234) STORED IN ROM |
| SET | 10 | RESTORING DISPLAY TO ORIGINAL |

ADDRESSABLE TERMINAL FOR CATV

BACKGROUND OF THE INVENTION

The present invention relates to an addressable terminal for cable television (CATV) and, more particularly, to a CATV addressable terminal adapted to have its address set and changed from outside of the terminal.

Heretofore, all address particular to an addressable terminal of the kind described has been set by an authorized person of a CATV system relying on a dip switch which is built into the terminal or by data which is stored in a read only memory (ROM). A problem with the ROM scheme is that the address cannot be changed unless the data is rewritten by opening the housing of the terminal and, then, removing the ROM. Another problem with such a scheme is that an IC (integrated circuit) socket is indispensable in order for the ROM to be removable, resulting in poor reliability. As regards the dip switch scheme, although it allows the address to be changed more simply than the ROM scheme, it gives an unauthorized person, such as the subscriber, a chance to open the housing and change the address intentionally. This drawback can only be eliminated by providing an elaborate housing structure or by resorting to some special device, such as an apparatus for disabling the entire terminal when an unauthorized person tries to gain access to the interior of the terminal.

SUMMARY OF THE INVENTION

It is, therefore, an object of the present invention to provide a CATV addressable terminal which solves the problems particular to the prior art addressable terminals discussed above.

It is another object of the present invention to provide a CATV addressable terminal whose address can be set and changed from outside of the terminal housing at the same time and, prevent it from being intentionally changed by an unauthorized person.

It is another object of the present invention to provide a generally improved CATV addressable terminal.

In an addressable terminal for cable television having a storage unit in the body of the terminal for storing an address of the terminal, the terminal includes means for comparing its own address with a terminal address which is part of an incoming terminal control signal and, if its own address is identical with the received terminal address, the terminal is allowed to operate as instructed by the control signal since it was determined that the control signal is meant for this particular terminal. The improvement in accordance with the present invention resides in the provision of a storage unit that is electrically erasable to rewrite the data stored therein, and in that an exclusive remote control key pad is provided for setting an address by writing an address into the storage unit from outside of the body of the terminal, whereby an address can be set and changed as needed.

The above and other objects, features and advantages of the present invention will become more apparent from the following detailed description taken in conjunction with the accompanying drawings.

BRIEF DESCRIPTION OF THE DRAWINGS

FIGS. 3A and 3B are tables each showing the relationship between the operation of the address setting keypad, the data appearing on a display of the terminal, and the operation of the terminal.

DESCRIPTION OF THE PREFERRED EMBODIMENTS

Figure 1:
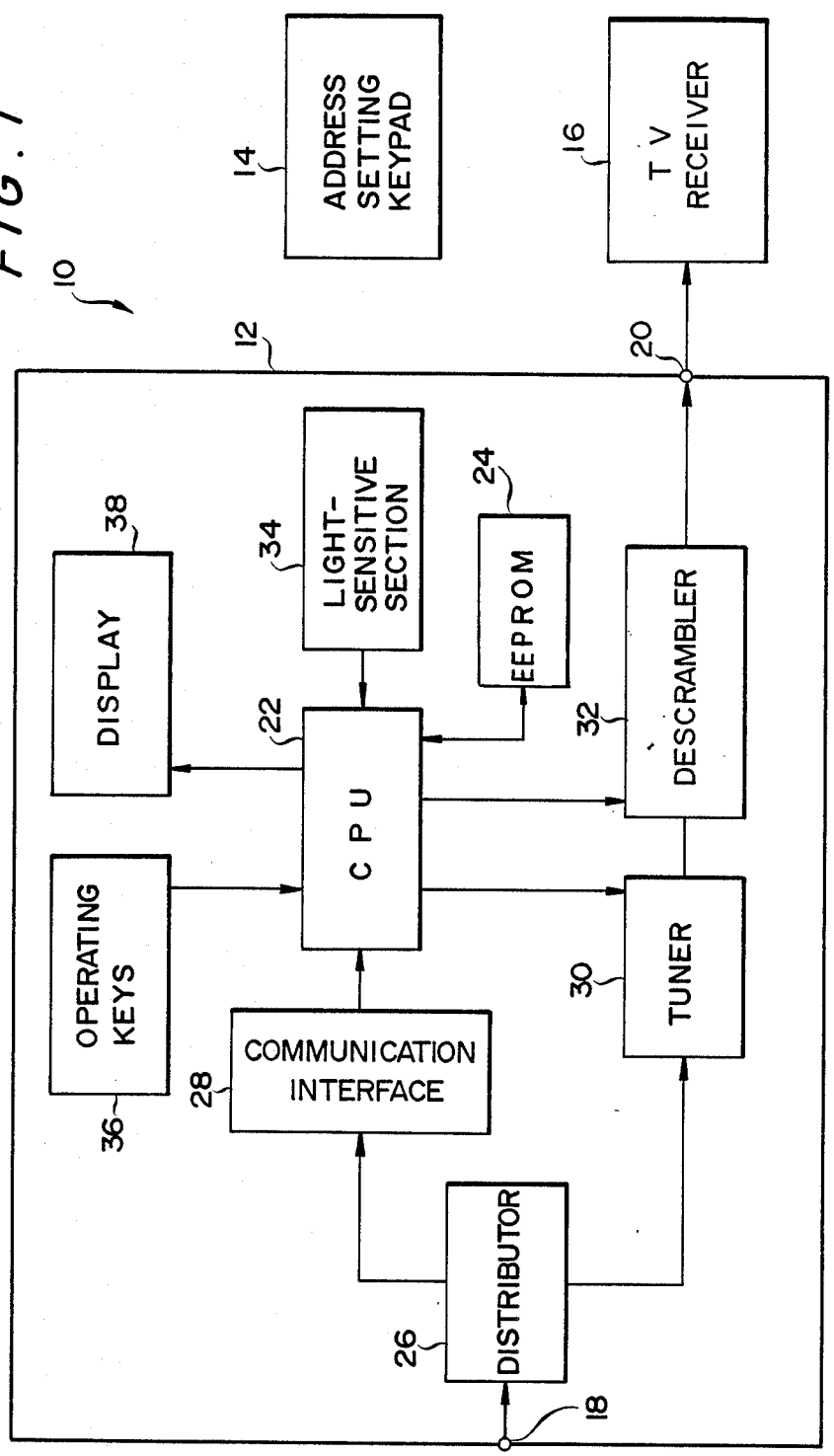
FIG. 1 is a schematic block diagram showing a CATV addressable terminal embodying the present invention.

Referring to FIG. 1 of the drawings, a CATV addressable terminal embodying the present invention is shown and generally designated by the reference numeral 10. As shown, the terminal 10 generally comprises a housing 12, a remote control keypad 14 for setting an address, and a TV (television) receiver 16. The terminal housing 12 is provided with an input terminal 18 which is connected to a CATV transmission path, and an output terminal 20 connected to the TV receiver 16. In this configuration, the input terminal 18 receives a terminal control signal and other signals from a central station, and the output terminal 20 delivers an output of the terminal 12 to the TV receiver 16. A CPU (central processing unit) 22 is installed in the terminal 12 while an EEPROM 24 is connected to the CPU 22. The EEPROM 24 serves as a ROM the content of which is electrically erasable, or rewritable. The input terminal 18 is connected to a distributor 26 which is in turn connected to a communication interface 28 and a tuner 30. The output terminal 20 is connected to a descrambler 32 which is adapted to descramble scrambled TV broadcasts. The descrambler 32 is connected to the tuner 30 and CPU 22. Also connected to the CPU 22 are a remote control light-sensitive section 34 which receives an address code from the address setting keypad 14, and operation keys 36 such as for channel selection. Further, a display 38 is connected to the CPU 22 to show the channel selected and the address data.

Figure 2:
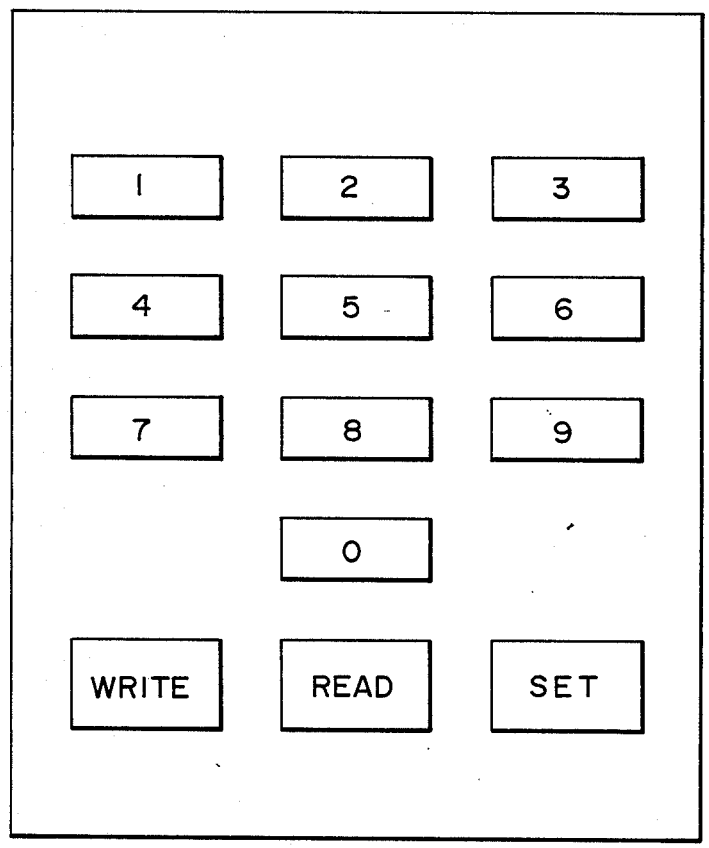
FIG. 2 is a diagram showing a specific arrangement of keys on an exclusive remote control keypad for setting an address into the terminal of FIG. 1 as well as in the terminal of FIG. 4.

FIG. 2 shows a specific arrangement of the keys on the address setting remote control keypad 14 which is adapted to set an address as previously stated. FIGS. 3A and 3B show, respectively, the relationship between the operation of the keypad 14, the data appearing on the display 38, and the operation of the CPU 22 which occur when address data is written in through the keypad 14 having the key arrangement of FIG. 2, and the relation between the same which occurs when address data is read out through the same keypad 14.

In operation, a code transmitted from the address setting keypad 14 is received by the light-sensitive section 34 and is then applied to the CPU 22. When the CPU 22 determines that the received code is a WRITE code, the CPU 22 temporarily stores address data which comes in after that code while showing it on the display 38. Subsequently, upon reception of a SET code, the CPU 22 erases the address data previously stored in the EEPROM 24 and writes the input address data instead as new address data while, at the same time, restoring the display 38 to original. On the other hand, if the received code is a READ code as distinguished from the WRITE code, the CPU 22 reads address data out of the EEPROM 24 to indicate it on the display 38 and, when a SET code is received, restores the display 38 to original.

Terminal control signals each including a particular address are sent from a central station to individual terminals for controlling the latter on a terminal basis. The terminal control signal applied to the input terminal 18 of the terminal 10 is routed through the distributor 26 and the communication interface 28 to the CPU 22. Then, the CPU 22 compares the address added to the control signal with the address which is stored in the EEPROM 24 so as to decide whether or not that control signal is meant for that particular terminal 10. If it is meant for the own terminal 10, the CPU 22 causes the terminal 10 to operate independently of the other terminals as instructed by the control signal.

The terminal control described above may be exemplified by the control associated with the participation in a pay TV broadcasting system which is based on a subscribers' contract. In such a case, the CPU 22 controls the descrambler 32 in response to a participation control signal, which is sent from a central station and meant for its own terminal 10, and based on a particular channel keyed in through the keys 36.

Figure 4:
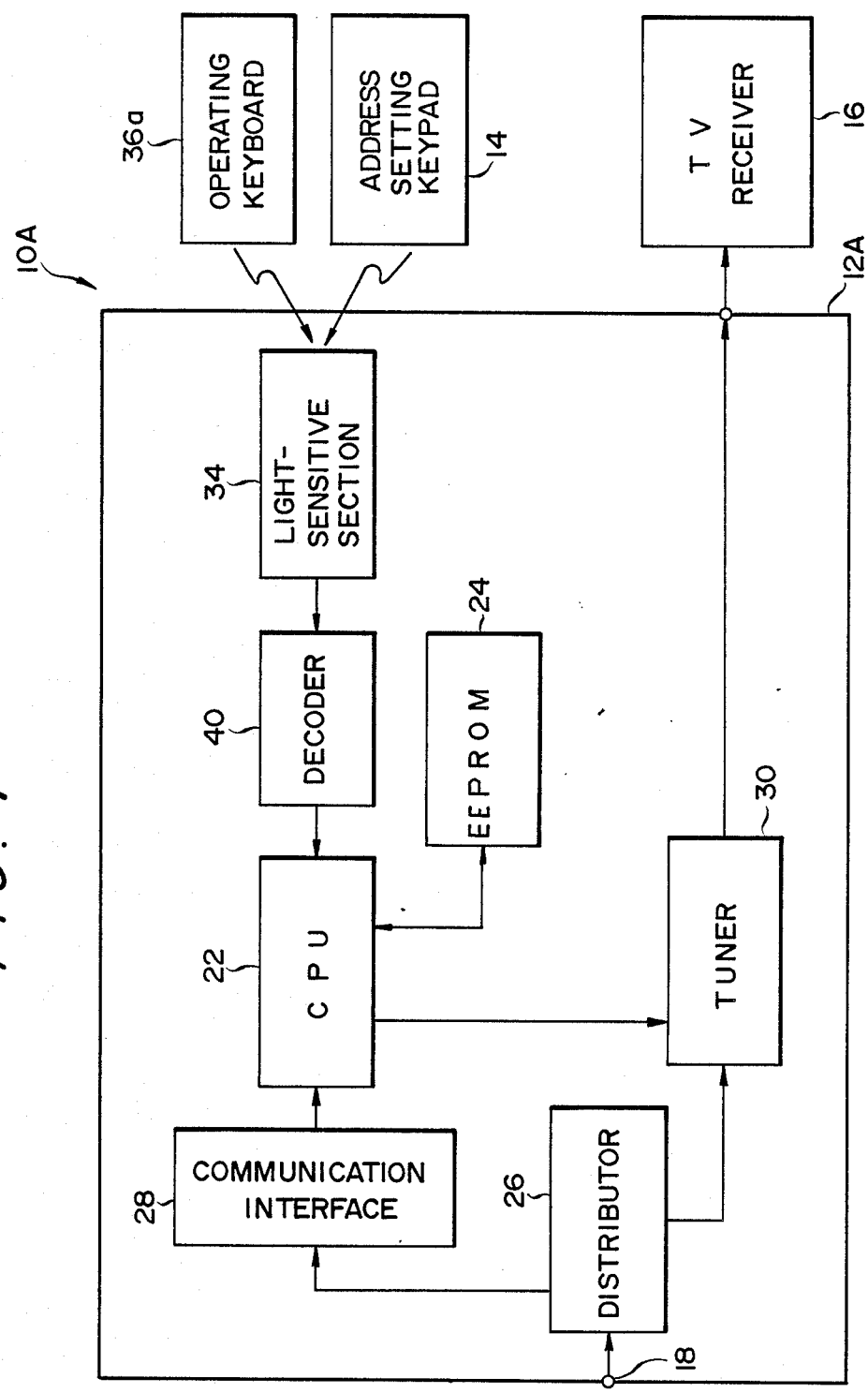
FIG. 4 is a schematic block diagram showing another embodiment of the present invention.

Referring to FIG. 4, another embodiment of the present invention is shown. In the figure, the same or similar structural elements as those shown in FIG. 1 are designated by like reference numerals, and detailed description thereof will be omitted.

In FIG. 4, the CATV addressable terminal 10A is provided with an operating remote control keypad 36a in place of the operating keys 36 as shown in FIG. 1, the keypad 36a being disposed outside of the terminal housing 12A. The light-sensitive section 34 is shared by the operating remote control keypad 36a and the address setting remote control keypad 14. Further, in this particular embodiment, a decoder 40 is connected between the light-sensitive section 34 and the CPU 22 for decoding a signal which is fed thereto from the light-sensitive section 34.

In operation, an address code sent from the address setting keypad 14 is received by the light-sensitive section 34, then decoded by the decoder 40, and then checked by the CPU 22 to see if it is an address code or an operation code. If the input code is an address code, the CPU 22 erases the address data stored in the EEPROM 24 and writes the input address code instead. If the input code is an operation code sent from the operating keypad 36a, the CPU 22 causes, for example, the tuner 30 to select a channel.

Again, a terminal control signal applied to the input terminal 18 as in the first embodiment is routed through the distributor 26 and communication interface 28 to the CPU 22. Then, the CPU 22 compares the address added to the control signal with the address which is stored in the EEPROM 24 so as to decide whether or not that control signal is meant for that particular terminal 10A. If it is meant for its own terminal 10A, the CPU 22 causes the terminal 10A to operate independently of the other terminals as instructed by the control signal.

In summary, it will be seen that the present invention achieves various unprecedented advantages as enumerated below.

(1) The address can be set and changed with ease from outside of a terminal.

(2) The address can be referenced and confirmed with ease from the outside of the terminal.

(3) Because an address setting remote control keypad uses codes which are different in kind from those of an ordinary operating remote control keypad, no one can change the address unless the address setting keypad is available.

(4) Because it is not necessary to remove a ROM which stores address data at the time when it is desired to set or change the address, the need for an IC socket is eliminated resulting in greater reliability.

Various modifications will become evident to those skilled in the art after receiving based upon the teachings of the present disclosure and without departing from the scope thereof.

What is claimed is:

1. An addressable terminal apparatus for cable television comprising: a terminal housing which contains a storage device for storing an address indicative of said terminal, said terminal including means for comparing the stored terminal address with an external terminal address which is part of an incoming terminal control signal and, means for operating said terminal as instructed by the control signal if said stored terminal address matches the incoming external terminal address received, thereby deciding that the control signal is meant for said terminal, the improvement wherein said storage device is electrically erasable to rewrite address data stored therein, and an exclusive remote control unit sets a new terminal address by writing the new terminal address into said storage device from a location outside of said terminal housing whereby the terminal address in said storage device is set and changed as needed.

2. The apparatus as claimed in claim 1, wherein said storage device comprises an erasable read only memory.

3. An electronically addressable terminal apparatus comprising:
input means for receiving an external control signal that includes terminal address data,
output means for supplying output signals to control a load as determined by said external control signal,
an electrically alterable data storage device for storing an address for said terminal,
electronic signal processing means coupled to said input means and to said data storage device, said signal processing means including means for comparing the terminal address stored in the data storage device with the terminal address data of said external control signal, and means for operating said terminal in accordance with said control signal to supply said output signal to said output means in response to a signal from said comparing means indicating a match between the external terminal address data and the terminal address stored in said data storage device,
an external remote control unit under exclusive user control for transmitting terminal address data signals to said terminal apparatus, and wherein
said electronic signal processing means includes means responsive to new terminal address data signals received from the remote control unit for rewriting said new terminal address data into the data storage device whereby the address of the terminal apparatus is electrically alterable from outside of the terminal apparatus.

4. An apparatus as claimed in claim 3, wherein said data storage device comprises an erasable read only memory.

5. An apparatus as claimed in claim 3, wherein said electronic signal processing means comprises a central processing unit coupled to said data storage device and to said input means, and said terminal apparatus further comprises:
- an operating keyboard coupled to said central processing unit to control the operation thereof, and
- a tuner coupled to said input means and controlled by the central processing unit to control signal flow between said input means and said output means, and wherein
- said output means is adapted to be coupled to a TV load apparatus.

6. An apparatus as claimed in claim 3, wherein said electronic signal processing means comprises a central processing unit coupled to said data storage device and to said input means, and said terminal apparatus further comprises:
- a turner coupled to said input means and controlled by the central processing unit to control signal flow between said input means and said output means, and
- an operating keyboard external to said terminal apparatus and coupled thereto in a wireless manner so as to supply control signals to said central processing unit to control the operation thereof.

* * * * *